US007912480B2

(12) United States Patent
Moosavi et al.

(10) Patent No.: US 7,912,480 B2
(45) Date of Patent: Mar. 22, 2011

(54) SYSTEM AND METHOD FOR ELECTRONIC NOTES IN A MOBILE ENVIRONMENT

(75) Inventors: Vahid Moosavi, Kitchener (CA); Somayeh Geraee Nezhad Fard, Kitchener (CA); Scott Rose, Kitchener (CA); Omar Barake, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 571 days.

(21) Appl. No.: 11/533,803

(22) Filed: Sep. 21, 2006

(65) Prior Publication Data

US 2008/0076400 A1 Mar. 27, 2008

(51) Int. Cl.
*H04W 24/00* (2009.01)
*H04M 1/663* (2006.01)

(52) U.S. Cl. .................................. 455/456.1; 455/412.2

(58) Field of Classification Search ............... 455/412.2, 455/456.1
See application file for complete search history.

(56) References Cited

U.S. PATENT DOCUMENTS

| 6,272,532 | B1 * | 8/2001 | Feinleib ........................ 709/206 |
| 6,446,004 | B1 * | 9/2002 | Cao et al. ...................... 701/213 |
| 6,463,463 | B1 * | 10/2002 | Godfrey et al. ............... 709/206 |
| 6,484,033 | B2 * | 11/2002 | Murray ....................... 455/456.3 |
| 2002/0164999 | A1 * | 11/2002 | Johnson ......................... 455/456 |
| 2003/0005060 | A1 | 1/2003 | Davidson et al. |
| 2003/0142125 | A1 | 7/2003 | Salmimaa et al. |
| 2003/0191969 | A1 | 10/2003 | Katsikas |
| 2003/0220937 | A1 | 11/2003 | Maeoka et al. |
| 2003/0224762 | A1 * | 12/2003 | Lau et al. .................... 455/412.2 |
| 2003/0225589 | A1 * | 12/2003 | Eaton et al. ........................ 705/1 |
| 2005/0085187 | A1 | 4/2005 | Jendbro et al. |
| 2005/0273493 | A1 * | 12/2005 | Buford et al. ................. 709/204 |
| 2006/0099977 | A1 | 5/2006 | Lai et al. |
| 2007/0106931 | A1 | 5/2007 | Vartiainen et al. |

FOREIGN PATENT DOCUMENTS

| EP | 1 564 944 | 8/2005 |
| WO | WO 02/079961 | 10/2002 |
| WO | WO 03/056487 | 7/2003 |

OTHER PUBLICATIONS

John Blau, IDG News Service, Siemens develops mobile post-it application, InfoWorld, Feb. 7, 2005.
Written Opinion of the International Searching Authority and International Search Report. Application No. PCT/CA2007/001699. Dated: Jan. 7, 2008.
European Search Report. Application No. 06121025.8. Dated: Mar. 16, 2007.

(Continued)

*Primary Examiner* — Nick Corsaro
*Assistant Examiner* — Edd Rianne Plata
(74) *Attorney, Agent, or Firm* — Bereskin & Parr LLP/S.E.N.C.R.L., s.r.l.

(57) ABSTRACT

A system and method for handling electronic notes in a mobile environment, wherein the system includes a memory configured to store an electronic note, which electronic note includes location information, a location detector configured to detect location information for the mobile device, and a processor configured to: monitor the location information for the mobile device based on data from the location detector; compare the location information for the mobile device with the location information in the electronic note; and activate the electronic note when the location information for the mobile device is within a predetermined distance of the location information in the electronic note.

20 Claims, 13 Drawing Sheets

OTHER PUBLICATIONS

Summons to Attend Oral Proceedings dated Jul. 27, 2009, European Patent Application No. 06121025.8.
Preliminary Opinion dated Jan. 12, 2010, European Patent Application No. 06121025.8.
Consultation by Telephone dated Jan. 13, 2010, European Patent Application No. 06121025.8.

International Preliminary Report on Patentability dated Apr. 2, 2009, International Patent Application No. PCT/CA2007/001699.
European Examination Report dated Nov. 6, 2008, European Patent Application No. 06121025.8.

* cited by examiner

SYSTEM AND METHOD FOR ELECTRONIC NOTES IN A MOBILE ENVIRONMENT

FIELD

This application relates to electronic "sticky" notes and in particular, to a system and method for electronic notes in a mobile environment in which the notes are activated based on function, location and/or time.

BACKGROUND

Self-adhesive note paper, sometimes called "sticky" notes or Post-it™ (trademark of 3M Corporation) notes, are pieces of stationery having a strip of weak adhesive on the reverse and designed for temporarily attaching notes to many types of surfaces, including documents, books, computer displays and so forth. Since their introduction, these notes have been very popular and are used in many different ways. While very popular, these paper notes have some drawbacks in that they are not backed up anywhere, can be easy to lose, and are difficult to organize efficiently, among other drawbacks.

More recently, many software applications have been developed to allow the use of electronic "sticky" notes with digital devices such as computers, personal digital assistants (PDAs), mobile phones, and the like. These electronic notes are intended to mimic the behavior of paper sticky notes but in a digital environment.

Electronic notes have been slow to catch on in the digital environment and do not appear to be as popular as sticky notes in the paper world. This may be because electronic notes are generally perceived to be less versatile than paper notes. For example, some software applications limit the placement or "adhesion" of the virtual note to a fixed spot over or on the desktop and it can be difficult to transfer notes to other devices. Further, the use of electronic notes typically requires a user to make a list, categorize items, check the content often, and delete the electronic notes when completed. These tasks can sometimes be difficult, particularly on a smaller device such as a mobile device, due to the limited screen space and the input options that may or may not be available.

As such, there is a need for an improved system for electronic notes.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

DETAILED DESCRIPTION

Figure 1:
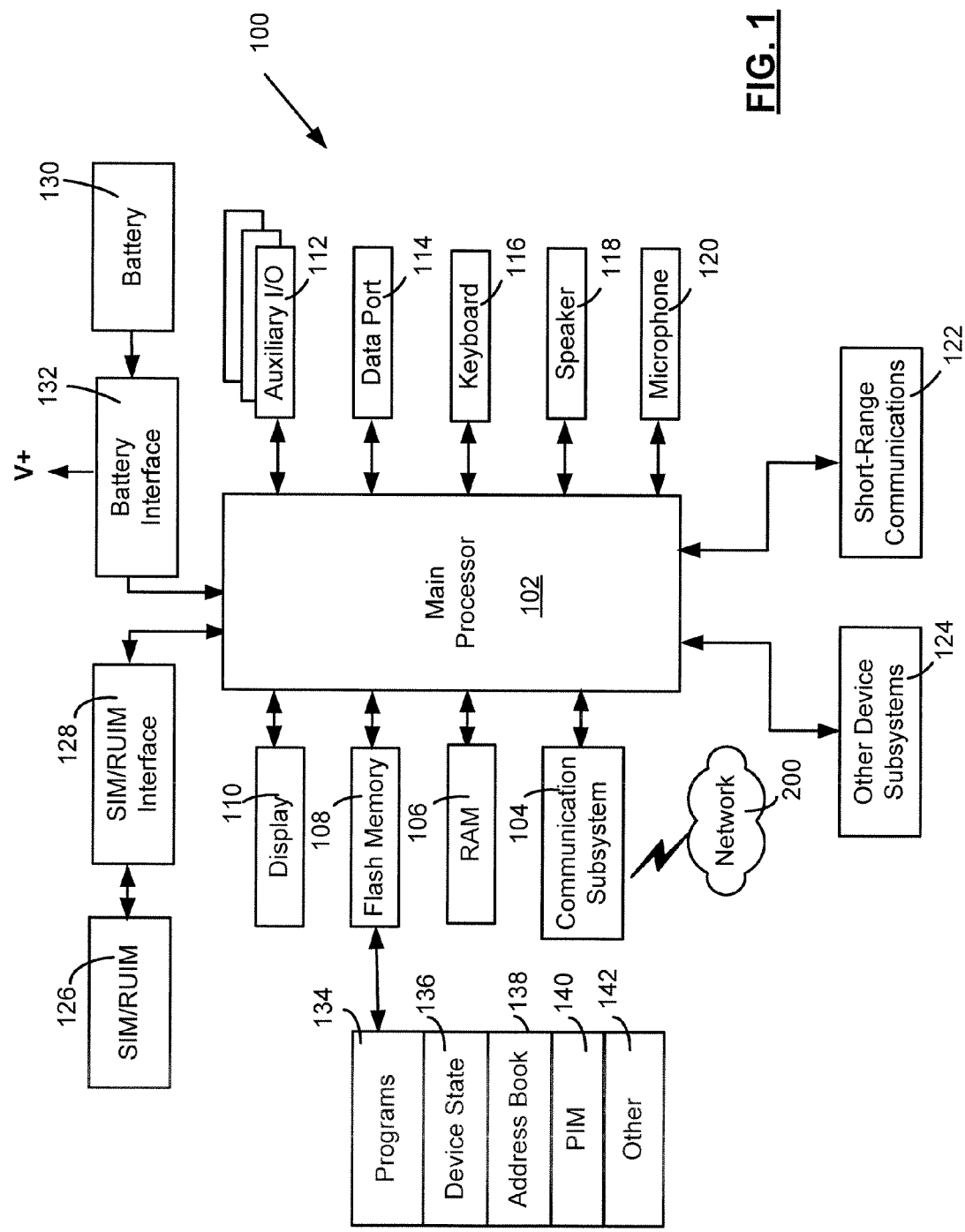
FIG. 1 is a block diagram of an exemplary embodiment of a mobile communication device.

The following description will provide an overview of aspects of the embodiments and then proceed to a more detailed description of the embodiments.

According to one aspect, there is provided a system for handling electronic notes in a mobile device, the system including: a memory configured to store an electronic note, wherein the electronic note comprises location information; a location detector configured to detect location information for the mobile device; and a processor configured to: monitor the location information for the mobile device based on data from the location detector; compare the location information for the mobile device with the location information in the electronic note; and activate the electronic note when the location information for the mobile device is within a predetermined distance of the location information in the electronic note.

In a particular case, the memory may be further configured to store location information, for example, in a location database, and the processor further configured to receive location information for storage in the memory.

In another particular case, the system may further include an input configured to receive electronic notes from another system and the processor is further configured to: compare a received electronic note with stored electronic notes; determine if an electronic note stored in memory matches with the received electronic note; and replace the stored note with the received note if there is a match. In this case, the electronic notes from another system may be received via e-mail. In this case, the system may further include an authorized sender list that stores a list of users authorized to send notes to the system and further comprises a filter to block electronic notes from users that are not on the authorized sender list.

In yet another particular case, the electronic note may further include a function indicator and a list of one or more recipients and the processor may be further configured to: monitor for changes in an electronic note having a function indicator; and send changes to the electronic note to the one or more recipients in order to synchronize the information in the electronic note with the one or more recipients.

In still yet another particular case, the electronic note may further include product information and the processor may be further configured to: compare the product information in the electronic note and the location information for the mobile device with the product information and location information provided by a merchant; and activate the electronic note when the location information of the mobile device is within a predetermined distance of the location information for the merchant and the product information in the electronic note corresponds with the product information provided by the merchant. In this case, the product information provided by the merchant may further include information indicating if a product is on sale and the processor may be further configured to activate the electronic note only if the product information in the electronic note corresponds with the product information provided by the merchant and the product is on sale.

In a further particular case, the system may further include a signaling device and be configured to activate the signaling device to provide a sensory signal to a user of the mobile device when the electronic note is activated.

In yet a further particular case, the system may further include a time detector configured to detect time information of the mobile device, the electronic note may further includes time information, and the processor may be further configured to: monitor the time information of the mobile device based on data from the time detector; compare the time information of the mobile device with the time information in the electronic note; and activate the electronic note when the time information of the mobile device is within a predetermined range of the time information in the electronic note.

In yet a further particular case, the system further includes an input configured to receive location information from another system and the processor is further configured to: compare received location information with stored location information; determine if location information stored in memory matches with the received location information; and replace the stored location information with the received location information if there is a match.

According to another aspect, there is provided a method for handling electronic notes in a mobile device. The method includes: storing an electronic note, the electronic note including location information; monitoring the location information for the mobile device; comparing the location information of the mobile device with the location information in the electronic note; and activating the electronic note when the location information of the mobile device approximately corresponds to the location information in the electronic note.

In a particular case, the method may further include storing location information, for example in a location list or database.

In another particular case, the method may further include: receiving electronic notes from another system; comparing a received electronic note with stored electronic notes; determining if a stored electronic note matches the received electronic note; and replacing the stored note with the received note if there is a match. In this case, the electronic notes from another system may be received via e-mail. In this case, the method may further include comparing received electronic notes with an authorized sender list and blocking received electronic notes that are not from an authorized sender.

In yet another particular case, the activating may include providing a sensory signal to a user of the mobile device.

In still yet another particular case, the electronic note may further include a function indicator and a list of one or more recipients and the method may further include: monitoring for changes in an electronic note having a function indicator; and sending changes in the electronic note to the one or more recipients in order to synchronize the information in the electronic note with the one or more recipients.

In a further particular case, the electronic note may further include product information and the method may further include: comparing the product information in the electronic note with product information provided by a merchant and comparing the location information of the mobile device with location information provided by the merchant; and activating the electronic note when the location information of the mobile device is within a predetermined distance of the location of the merchant and the product information in the electronic note corresponds with the product information provided by the merchant. In this case, the product information provided by the merchant may further include information indicating if a product is on sale and the method may further include activating the electronic note only if the product information in the electronic note corresponds with the product information provided by the merchant and the product is on sale.

In yet a further particular case, the electronic note may further include time information and the method may further include: monitoring time information of the mobile device; comparing the time information of the mobile device with the time information for the electronic note; and activating the electronic note when the time information of the mobile device approximately corresponds to the time information in the electronic note.

In yet a further particular case, the method further includes: receiving location information from another system; comparing received location information with stored location information; determining if stored location information matches the received location information; and replacing the stored location information with the received location information if there is a match.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
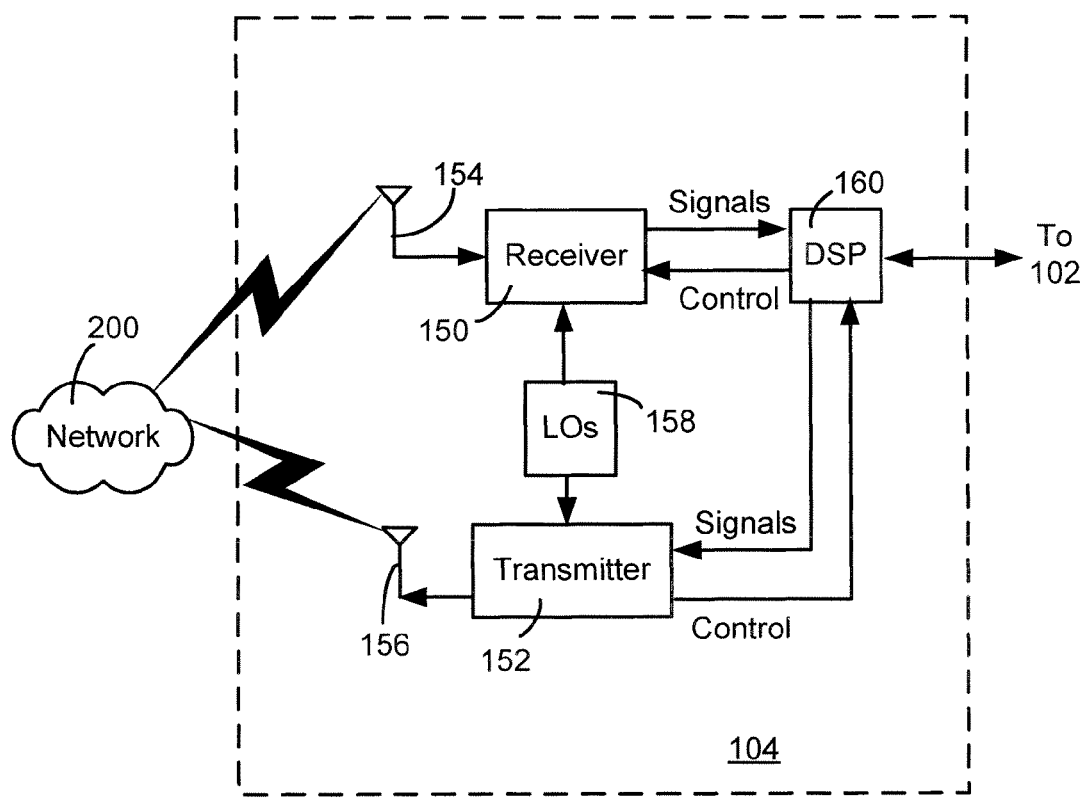
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gains applied to communication signals in the receiver 150 and transmitter 152 can be adaptively controlled through automatic gain control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
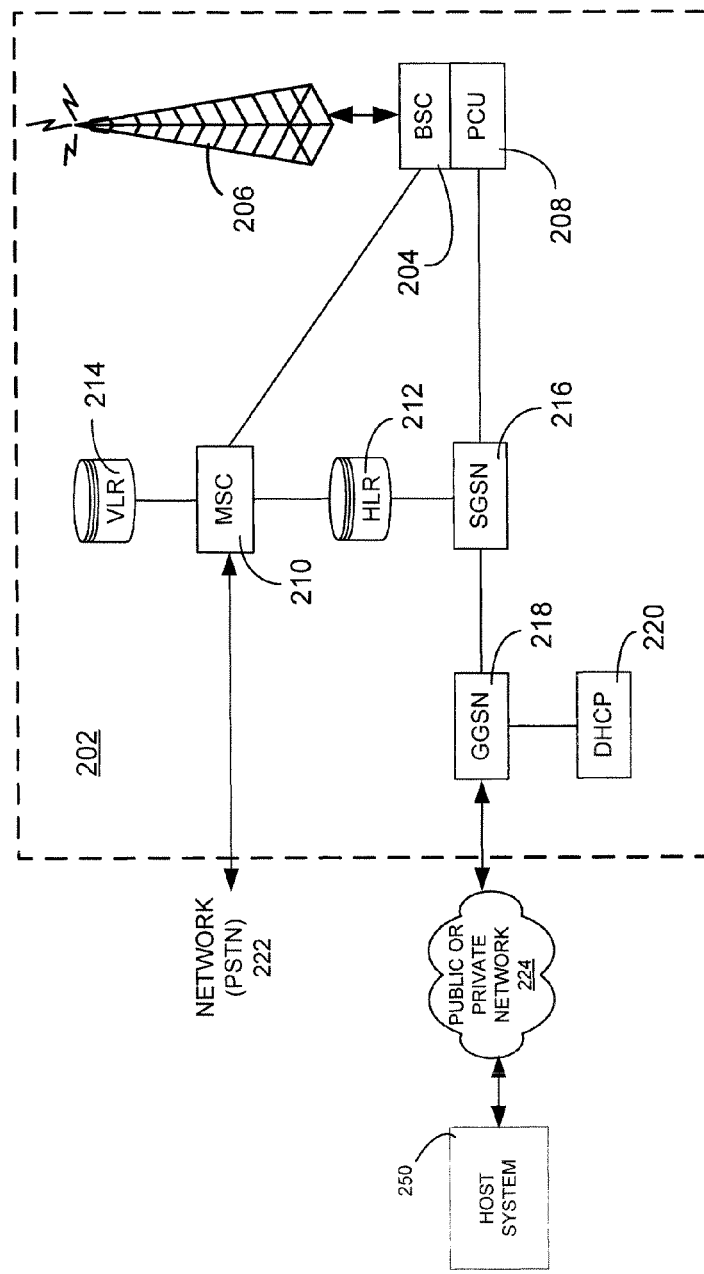

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-in User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
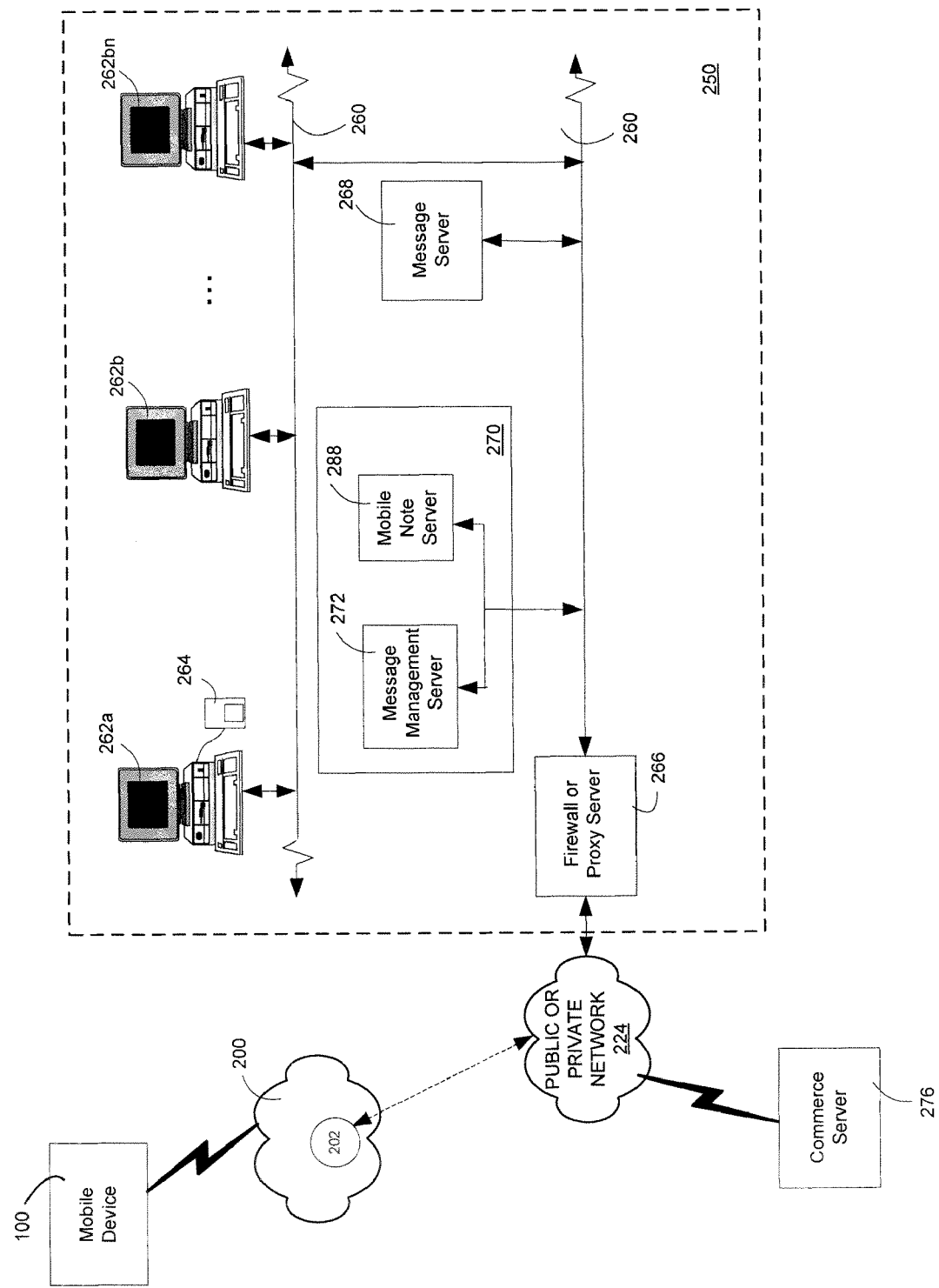
FIG. 4 is a block diagram of an exemplary embodiment of a host system.

Referring now to FIG. 4, a block diagram illustrating components of a host system 250 in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, for example, through data port 114, and may be particularly useful for bulk information updates often performed in initializing mobile device 100 for use. The information downloaded to mobile device 100 may include certificates used in the exchange of messages. It will be understood by persons skilled in the art that the cradle 264 is not required to connect the mobile device 100 to the computer 262a and that computers 262a, 262b will typically also be connected to other peripheral devices not explicitly shown in FIG. 4.

Furthermore, only a subset of network components of LAN 250 are shown in FIG. 4 for ease of exposition, and it will be understood by persons skilled in the art that LAN 250 will generally comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is one in which a VPN connection can be established directly through a specific wireless network to mobile device 100. The possibility of using a wireless VPN router has only recently been available and could be used when Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES), Triple DES or Advanced Encryption Standard (AES)) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

The wireless support components 270 may also include a mobile note server 288 that, in a similar manner to that of the message management server 272, facilitates the handling of electronic notes. For example, mobile note server 288 may: provide a storage area for a user's electronic notes; monitor for new or edited notes; communicate with other devices when a note is edited; communicate with other servers; and the like.

It will be understood by persons skilled in the art that message management server 272 and mobile note server 288 need not be implemented on a separate physical server in LAN 250 or other network. For example, some or all of the functions associated with message management server 272 and mobile note server 288 may be integrated with message server 268, or some other server in LAN 250. Furthermore, LAN 250 may comprise multiple message management servers 272 or mobile note server 288, particularly in variant implementations where a large number of mobile devices need to be supported.

As shown in FIG. 4, the mobile device 100 or the host system 250 may also connect to a commerce server 276, generally via shared network infrastructure 224. The commerce server 276 is provided by one or more merchants and includes information about the merchants (including location information) and about the types of merchandise sold by each merchant, and may further include information regarding the actual products available of the merchant location (collectively, "commerce information"). The commerce server may also be updated regularly with information about merchandise that is on sale and the time period for the sale. It will be understood by persons skilled in the art that commerce server 276 need not be implemented on only one physical server and may comprise any number of servers that include commerce information and that may relate to information from many merchants.

Now that the general mobile environment has been described, an exemplary embodiment of a system and method for electronic notes in a mobile environment will be described.

Figure 5:
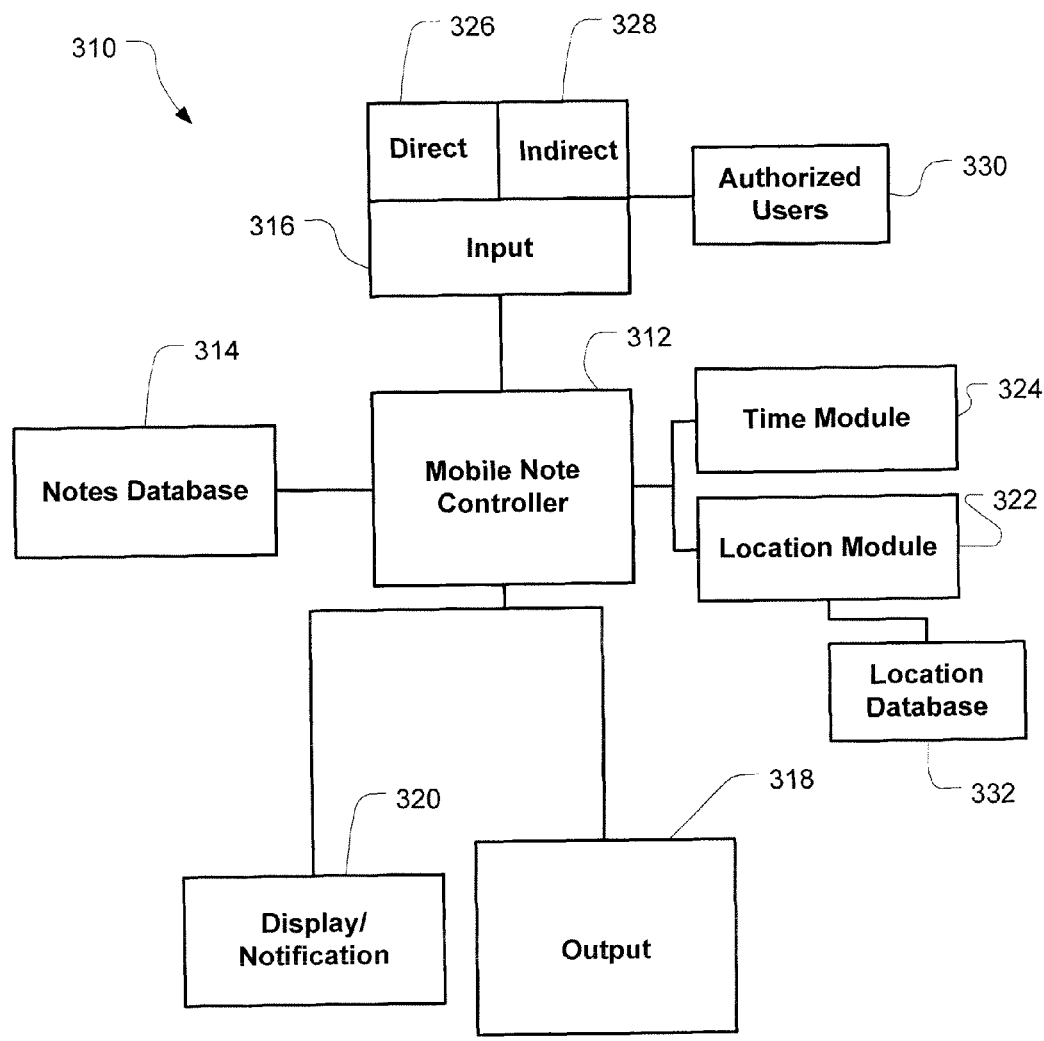
FIG. 5 is a functional block diagram of an exemplary embodiment of a system for electronic notes.

FIG. 5 is a block diagram of an exemplary embodiment of a system for electronic notes 310 in a mobile environment. This system 310 includes a mobile note controller 312, which controls the operation of the system 310 and co-ordinates the various functional blocks within the system 310. The mobile note controller 312 is connected to, and interacts with, a notes database 314, an input module 316, an output module 318, a display/notification module 320, a location information module 322 and a time information module 324.

The system 310 allows a user to enter electronic notes into the notes database 314 via the input module 316 and the mobile note controller 312. When entering a new electronic note or editing an electronic note, the user (the person inputting the electronic note) is given the option of entering information, for example, in various fields, including, for example, a location and a time. This information allows the person inputting the electronic note to better define when the electronic note should be made active and/or when a user is to be notified.

For example, a spouse at home may realize at ten o'clock in the morning that the family needs milk for the next day. That spouse will be able to enter an electronic note in a mobile device or in a home computer for sending to the spouse that is already at work. When entering the electronic note, the spouse at home will specify as the title "Buy Milk" and will specify a time of 4:00 p.m. so that the electronic note will not alert the spouse at work until closer to the time at which the spouse at work will be leaving to come home. The spouse at home may also specify a location, such as a grocery store, that is on the way home for the spouse at work. A system 310 on the mobile device 100 of the spouse at work will receive the electronic note and store it in the notes database 314. The system 310 will then activate the electronic note at the appropriate time and/or location such that the spouse at work will only be notified by their mobile device 100 of the new electronic note at the appropriate time and can also be notified again as they are approaching the grocery store on their way home.

As seen from the above example, the input module 316 includes both a direct input module 326 and an indirect input module 328. The direct input module 326 allows a user to enter new electronic notes directly into the system 310 whereas the indirect input module 328 allows system 310 to receive electronic notes from outside parties and adds the electronic notes to the notes database 314. In a particular case, the indirect input module 328 may also be provided with an authorized user database 330, such as, for example, a list of authorized users, which restricts the indirect entry of electronic notes so that only authorized users may indirectly input electronic notes. The authorized users may be identified by an address used to send electronic notes (for example, an e-mail address or similar) or some other identification. In some embodiments, the outside parties or authorized users that send electronic notes may also be able to edit/replace an electronic note that they have previously sent to the mobile device 100 as described in further detail below. Further, the system 310 may include other filters, such as a filter to prevent an outside party or authorized user from sending more than a predetermined number of messages in a predetermined time period or a filter to block specific outside senders of electronic notes.

The output module 318 is used by the mobile note controller 312 to output electronic notes that have been created locally but that are to be sent to another user for addition to that user's notes database 314.

On input of a new electronic note, either directly or indirectly, the electronic note is stored by the mobile note controller 312 in the notes database 314. The mobile note controller 312 then uses the location information module 322 and time information module 324 to monitor the location and time of the mobile device 100 to thereby determine, based on the location and time information received, whether or not to activate the electronic note.

As will be understood by a person skilled in the art, the time information module 324 can be provided by a clock or the like that is on the mobile device 100 or alternatively, the time information module 324 may receive a timing signal received by the mobile device 100 for some external source (not shown). The time information module 324 is used to monitor the current time and to allow the mobile note controller 312 to determine when an electronic note should be activated.

Similarly, the location information module 322 may be any of various known or hereafter developed systems for tracking and identifying the location of a mobile device, including systems such as the global positioning system (GPS), base station triangulation, RFID systems and the like. The location information module 322 allows the mobile note controller 312 to monitor the location of the mobile device 100 (as represented by location information such as GPS data, relative distances in relation to base stations, or other data representing location) and determine when an electronic note should be activated in relation to location. In particular, the mobile note controller 312 can be set to activate the electronic note when the location of the mobile device 100 approximately corresponds to the location in an electronic note. For example, when the mobile device 100 is within a predetermined distance of the location specified in the electronic note.

The predetermined distance may be, for example, a radius of 2 km, 1 km, 500 m, 250 m or some other appropriate distance. Further, the predetermined distance may be set at manufacturing or may be settable by a user, for example, the user of the mobile device 100 may set a default value or the user that sends the electronic note may set a specific value. In some embodiments, the predetermined distance may be set by a user depending on the importance of the item in the mobile note. It will be understood that modules such as the location information module 322 may be a part of the mobile device 100 or may be independent units that communicate with the mobile device 100 via a communications system such as the Bluetooth™ wireless communications system.

The location information module 322 also preferably includes a location database 332, which is accessible by the mobile note controller 312. The location database 332 maintains a list of locations (that is, for example, a location name, such as "work" and location information representing the physical location in one ore more predetermined formats) that may be used by a user. The locations in the location database 332 can be entered into the location database 332 through the mobile note controller 312 by, for example, creating an electronic note when in a particular location and selecting that the location be saved for future reference. For example, when visiting a grocery store that is near a user's house, the user may enter that location for future reference. In future, when the user is at a different location and wishes to enter a note that is activated when near the grocery store, the user is able to select the grocery store from the list of common locations in the location database 332. Alternatively, locations may be entered by receiving information from an on-line mapping resource that may be accessed through an Internet browser on the mobile device or the like.

Once locations have been entered into the location database 332, a user's location list from the locations database 332 can be sent to other users by, for example, sending an electronic note with the subject "locations" or some other suitable identifier that notifies the user's system 310 to attach the sending user's location list. Similarly, the receiving user's system 310 may then identify an electronic note as including a location list based on the identifier and save the location list into a locations database 332 on the receiving user's system 310. In particular, the location list can be saved in association with the sending user's address or other identification. In this way, when a sending user is sending an electronic note to a receiving user, the sending user can specify a location from the sending user's location list or from the receiving user's location list.

The display/notification module 320 is used by the mobile note controller 312 to display electronic notes on the display 110 of the mobile device 100 and to also provide notification to the mobile device user.

Figure 6:
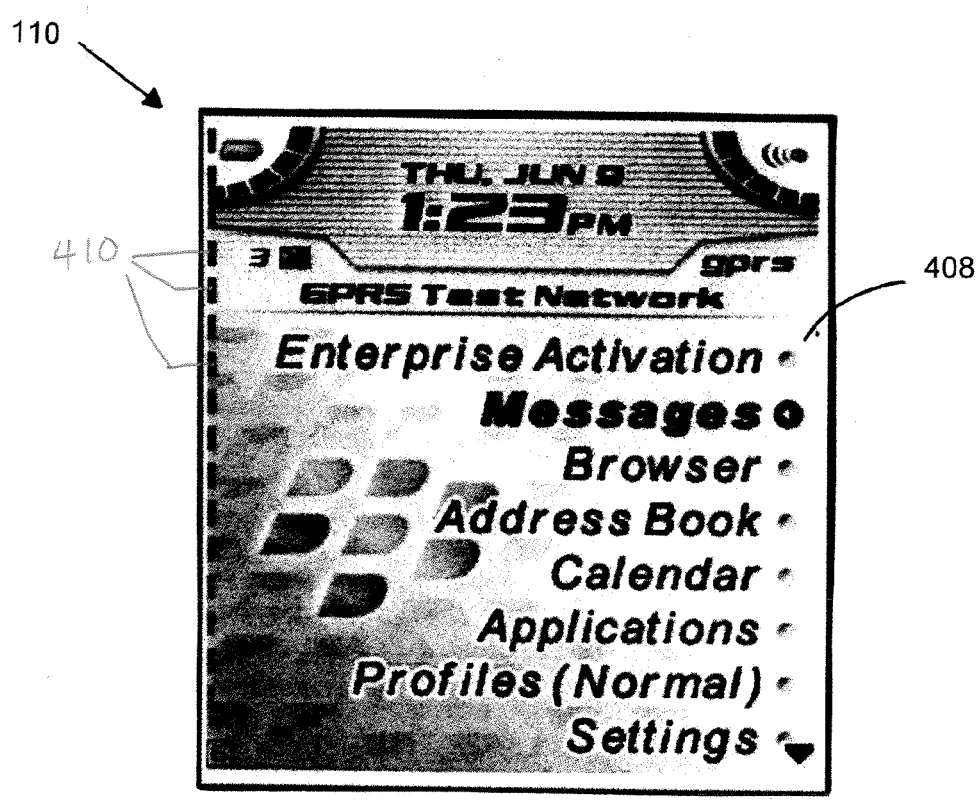
FIG. 6 is a screen shot showing electronic notes on a mobile device display.
Figure 7:
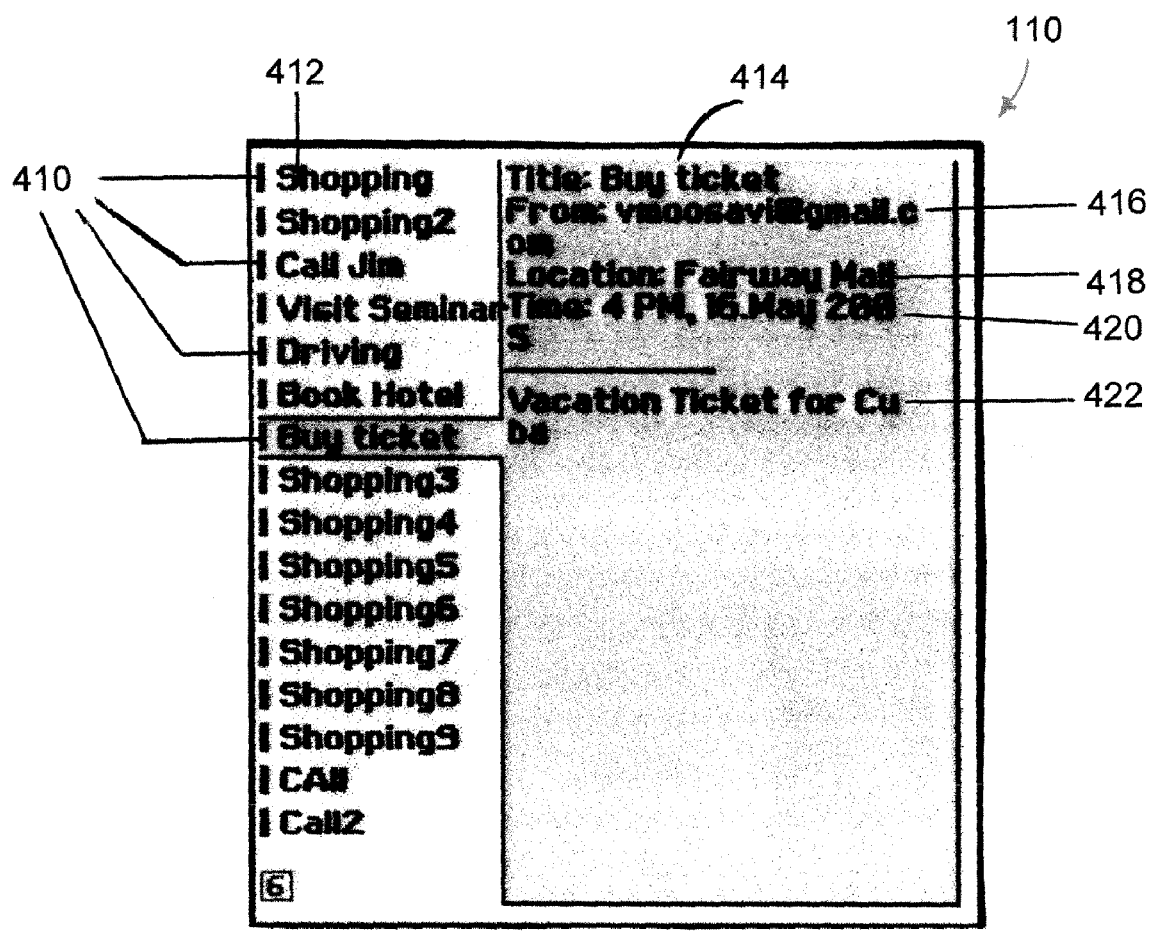
FIG. 7 is a screen shot showing an electronic note that has been scrolled on the display of FIG. 5.
Figure 8:
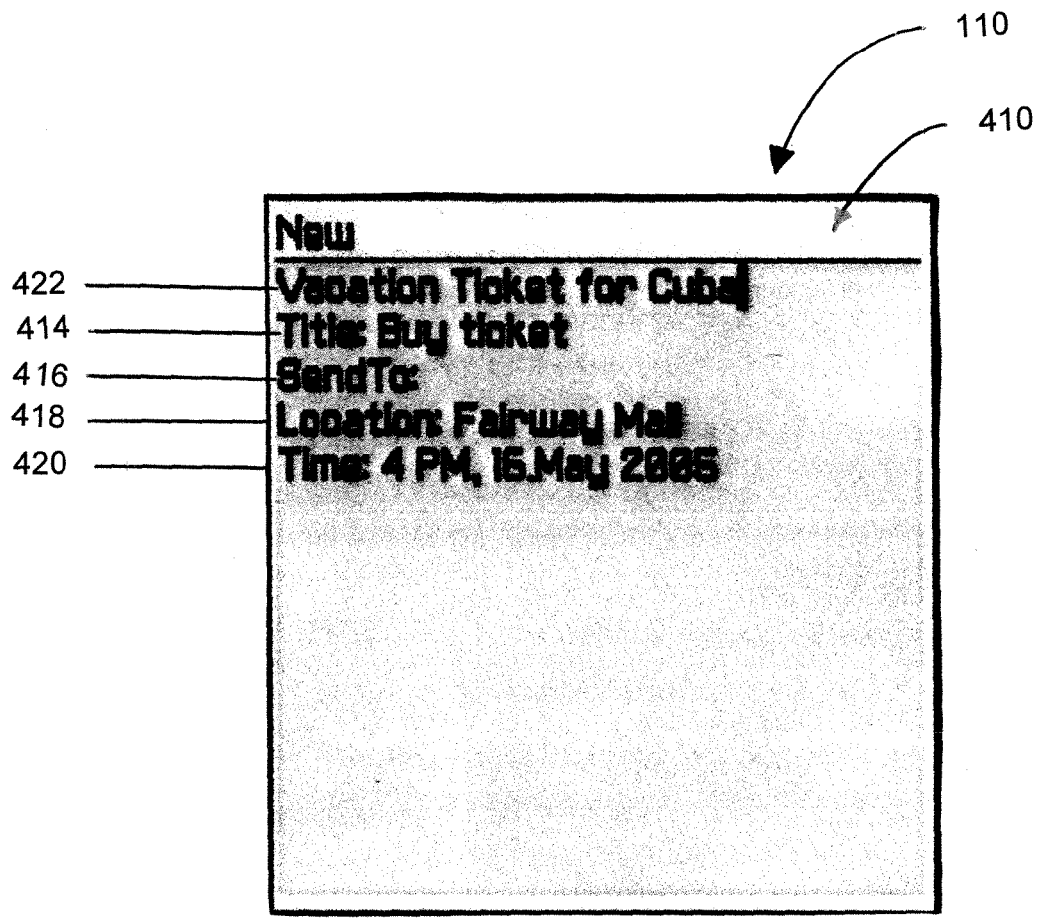
FIG. 8 is a screen shot showing an electronic note being added as displayed on the screen of FIG. 5.

The display of the electronic notes may take various forms as described in reference to examples shown in FIGS. 6-8, which show the display 110 of the mobile device 100. In this example, a main screen 408 of the mobile device 100 shows the electronic notes 410 as smaller rectangular tabs along the edge of the display 110. The electronic notes function can then be selected from the main screen 408 by using any of various input devices including, for example, tapping the screen with a stylus or scrolling to the tabs using a scroll wheel. As shown in FIG. 7, when the electronic notes function is selected from the main screen 408, the titles 412 of the electronic notes 410 are shown beside each electronic note 410 and an input device can be used to select an individual electronic note 410 such that details 412 of the electronic note 410 are displayed in a window on the display 110. In this example, each electronic note includes various fields including a title 414, the person 416 who generated the electronic note (or the person to whom the note is directed), the location 418 where the note is expected to be activated, and the time 420 that the note is expected to be activated, as well as a general field 422 for entering additional information. FIG. 8 shows an example display 110 during entry of a new electronic note 410. As shown, the user has the ability to enter the necessary information into the electronic note 410 using any of various input mechanisms. The interface used for editing an electronic note 410 will generally be similar to the interface used for entering a new note.

It will be understood that there are a variety of ways of handling a new electronic note on receipt and based on the condition of the electronic note as active or not (i.e. whether or not the time/location for the electronic note has been reached or not.) In some embodiments, these settings that govern the handling of electronic notes can be user configurable. For example, when an electronic note is first received and not yet activated, the electronic note may be displayed as a rectangular area on the side of the display 110, as shown in FIG. 6. Alternatively, the electronic note may not be displayed in this manner until the electronic note is activated based on one or more of time and/or location. In this way, the user would not have to view or consider any notes that are not active. Further, the user may or may not be otherwise notified on receipt of a new electronic note, for example, by some sensory notification or the like.

Once an electronic note is activated based on time and/or location, various actions may be performed by the mobile note controller 312. These actions may include displaying the note on the display 110 or otherwise notifying the user. For example, the user of the mobile device 100 may be notified via some form of sensory notification.

The display/notification module 320 provides the functionality of notifying a user of the activation of the electronic note. In particular, as noted above, the notification may be display of the electronic note or may be another kind of sensory notification and take any of various forms, including, for example, audible, visual (e.g. flashing LED, screen display, etc.), vibration, or other sensory signal that are known to one of skill in the art or which may hereafter be developed. As explained briefly above, notification regarding an electronic note may also occur in stages such that an electronic note may not even appear as a tab on the display 110 until the time is reached (activation) after which the electronic note will then be displayed as a tab but no other notification will be given until the location is reached, at which point the user may be notified by a vibration signal or the like. Alternatively, the electronic note may be displayed as a tab on the display as soon as received but may then be displayed in a different color based on the specified time being reached and may further be altered when the location is reached. Various other arrangements will be understood by those of skill in the art. It will also be understood that display/notification settings may be adjusted by the user.

The system according to the present embodiment has the advantage that electronic notes can easily be sent from one user to another and also has the advantage that the electronic notes will be activated at a time and/or a location that is convenient for the user and provides some connection between the notification and the task or information that is provided in the electronic note.

In another exemplary embodiment, the user may be able to create an electronic note that has a particular function/category (referred to as a "function electronic note"), such as, for example, a grocery list. In this case, the electronic note will include a field that allows a user to specify if the electronic note is functional and may also include a function field for information regarding the function/category, for example, grocery, gifts, favorite menus, or the like. It will be understood that the function field may correspond to the title field described above. An function electronic note having the function of grocery list may then have items or elements entered into the electronic note such as, for example, produce, meat, milk, cleaning supplies, and other common grocery related items. Items may be added to and removed from the function electronic note without the note being removed from the notes database.

In this embodiment, the function electronic note may also be present on more than one user's mobile device. For example, within a family each spouse may have a copy of a "grocery" electronic note which contains the most recent items needed from the grocery store. Either spouse may add/remove/edit items to the grocery electronic note and the mobile note controller 312 will be configured to automatically update a corresponding grocery electronic note on the other spouse's mobile device. When an electronic note is designated as a function electronic note and added to the notes database 314, the mobile note controller 312 controls the input module 316 and output module 318 such that changes made by any user of the function electronic note is reflected in the current version of the function electronic note in other user's notes databases 314.

Other examples of lists that may operate in this manner are lists of presents for particular holidays or special events within a group, favorite dishes at a particular restaurant, prescriptions, flowers or the like.

Figure 9:
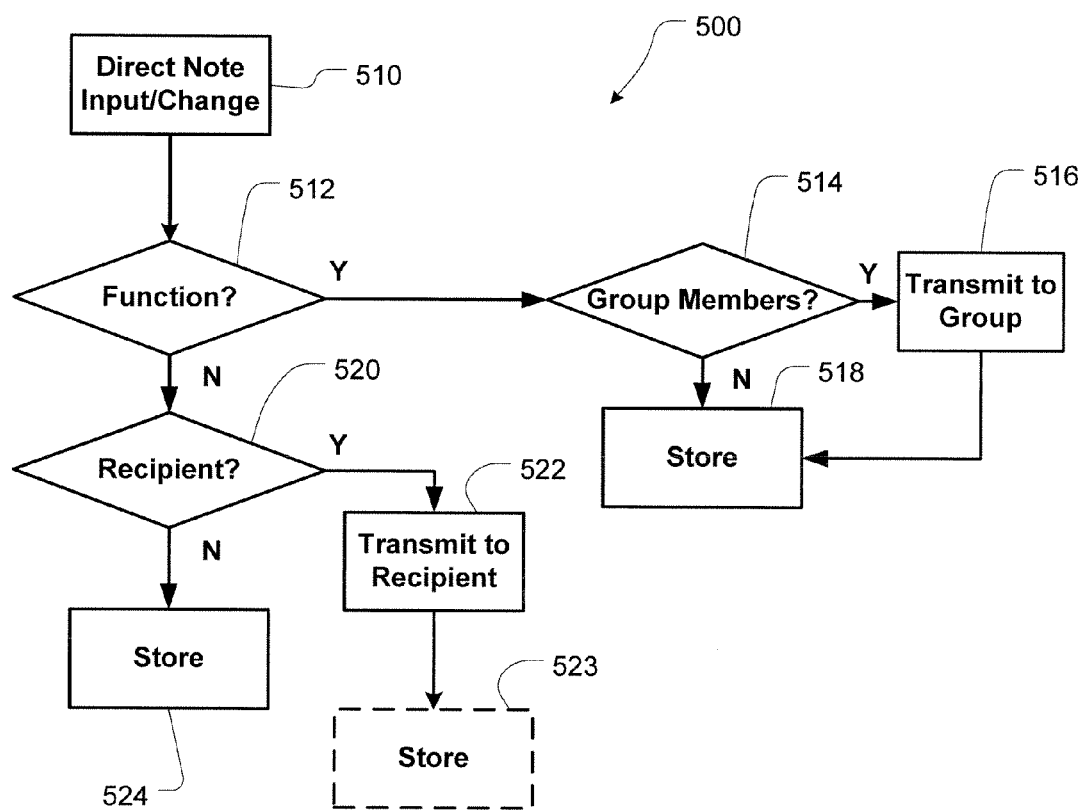
FIG. 9 is a flowchart of an exemplary method for directly adding/editing electronic notes.

FIG. 9 is a flowchart of an exemplary method 500 of directly inputting or editing an electronic note in this embodiment. The user enters the electronic note or the change to the electronic note at 510 and then, at 512, the system 310 determines whether or not the electronic note is a function electronic note. If the electronic note is a function electronic note, the system 310 determines whether or not there are group members associated with the function electronic note at 514. If so, the function electronic note is sent to the group members at 516 and is then saved into the notes database 314 at 518. If there are no group members at 514 the note is saved directly into the notes database 314 at 518.

If the electronic note is determined not to be a function electronic note at 512, then the system 310 determines whether or not the electronic note is intended to be sent to another user at 520. If the electronic note is intended to be sent to another user, the note is transmitted to the intended recipient at 522. As will be understood by one of skill in the art, the sent electronic note may also be saved on the sender's mobile device 100 (at 523) for future reference and/or future editing.

If the electronic note is not intended to be sent to another user at 520, the note is stored only in the notes database 314 of the inputting user at 524.

In the flowchart of FIG. 9, it will be understood that a similar procedure will apply to both initially inputting and editing/changing an electronic note. When an electronic note is edited, the electronic note can be resent to the intended recipient or function group members, as appropriate.

Figure 10:
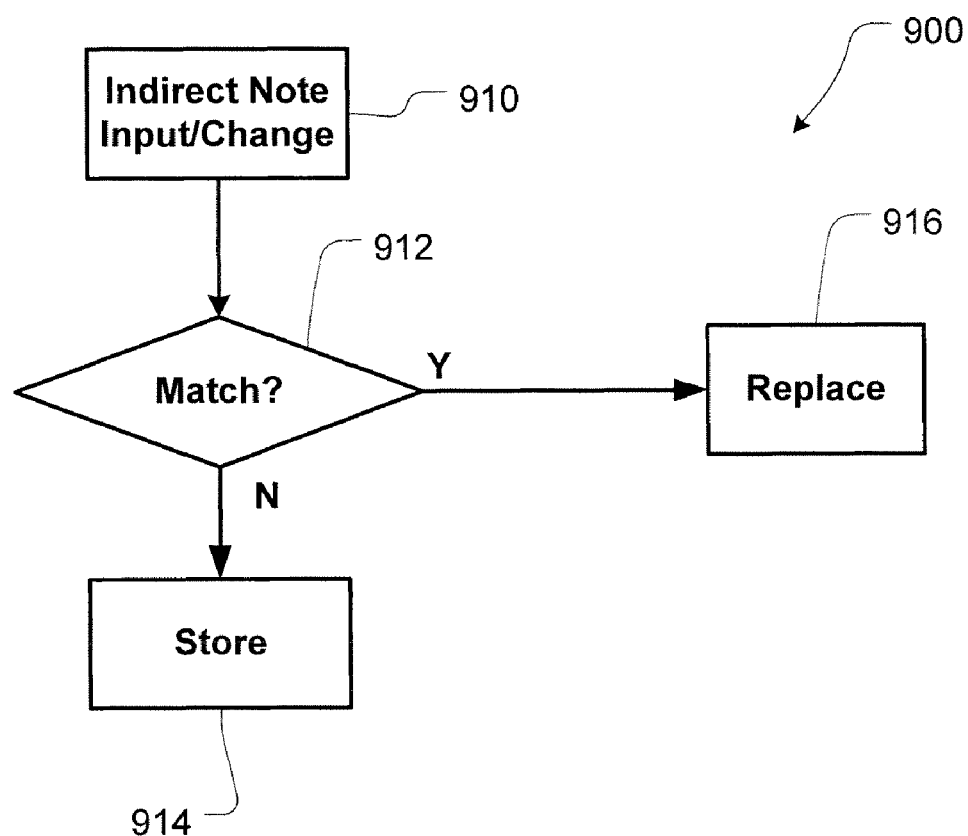
FIG. 10 is a flowchart of an exemplary method for indirectly adding/editing electronic notes.

FIG. 10 shows an exemplary process 900 upon indirect receipt of a new or edited note. The process 900 begins with the indirect receipt of a note (910). The system 310 on the recipient mobile device 100 then searches the notes database 314 to determine if the received electronic note matches an existing note (either function electronic note or electronic note) (912). If the electronic notes do not match, the received electronic note is stored in the notes database 314 (914). If the electronic notes do match, the existing electronic note can be replaced with the received electronic note (916). There are various methods/procedures of comparing electronic notes to determine if the electronic notes match, for example, if the newly received electronic note is from the same user and has a function or title/subject that matches with the function or title/subject of the previously received electronic note, there may be a match. Further, other methods may be found in the e-mail technical field related to e-mail threads or the like, and any of these various methods may be used. In a particular case, an electronic note may also include an additional field that indicates whether or not the electronic note is a new electronic note or an edited electronic note to facilitate the matching process. Further alternatively, the receiving user may be queried to determine if a received electronic note is a match with an existing electronic note, either upon receipt or at a later time/location.

In a similar way to the method for indirectly receiving a new or edited electronic note as described above, when an electronic note is received that is identified as including a location list, the receiving system 310 may save a new location list or replace an existing location list from the sending user with the new location list from the sending user. In this way, users may edit their location lists and then easily send an updated location list to other users or authorized users that could make use of such a list. In a particular case, the system 310 may be configured to automatically send a location list to a predetermined set of recipients following any updates in the user's location list. Similarly, at the receiving system 310, the location list may be updated automatically without notifying the recipient user.

In this description, it will be understood that the transmission of electronic notes between mobile devices 100 or mobile devices 100 and other computing devices may be performed using e-mail functionality as is known in the art and, in this light, may include the use of message management server 272 as described above. In these cases, it may be useful to provide a separate indication that a particular message is an electronic note or an e-mail message. In this case, the electronic notes may be transmitted directly between mobile note controllers 312 on respective mobile devices 100 using message management server 272.

As an alternative, electronic notes may be transmitted between mobile devices 100 and other computing devices using a separate notes functionality and may be managed by mobile note server 288 in a similar way to the handling of e-mail by message management server 272. In this alternative, electronic notes can also be stored on mobile note server 288 and be pushed to the mobile device 100 when a new note arrives or when a note is edited. Mobile note server 288 may also manage and process edited electronic notes and function electronic notes to perform the matching with existing electronic notes. The use of the mobile note server 288 is intended to relieve some of the processing load of the mobile device 100 and may also be used as a back-up of electronic notes.

Figure 11:
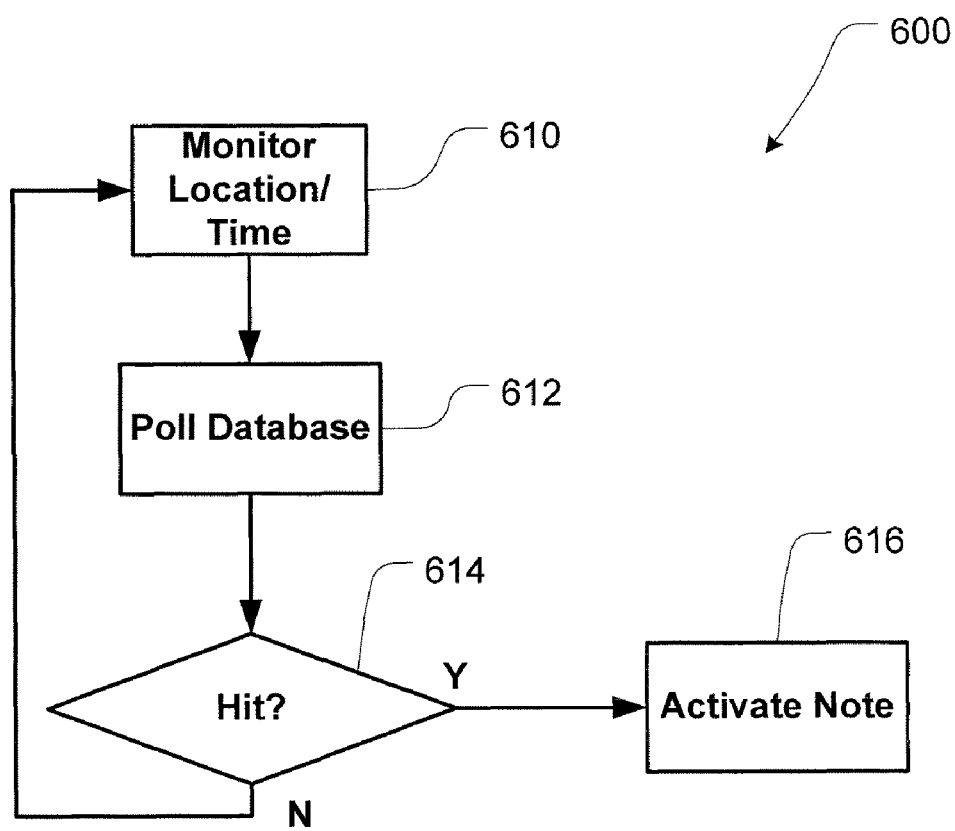
FIG. 11 is a flowchart of an exemplary method for notifying a user in regard to a mobile note.

FIG. 11 is a flowchart illustrating an exemplary method 600 for notifying a user in relation to a particular electronic note when the note is activated. At 610, the mobile note controller 312 monitors the location and/or time information received from the time information module 324 and location information module 322 and, making use of the current location and/or time information at 612 either continually or periodically polls the notes database 314 with regard to the location and/or time information entered for the electronic notes in the notes database 314.

If during polling the mobile note controller 312 detects a hit with regard to location and time at 614, that is, a correspondence between a location and/or time at 614 in a particular electronic note and the current location and/or time of the mobile device 100, the mobile note controller 312 proceeds to activate the note and/or notify the user at 616. If there is not a hit at 614, the mobile note controller 312 continues to monitor location and/or time and poll the notes database 314 at 612. It will be understood by one of skill in the art that the mobile note controller 312 may also change the form/color or the like of the electronic note on the mobile device display 110 based on its current condition. For example, an electronic note that has passed the due time may be displayed in red rather than in yellow. Further, a note that is currently within range of its target location may be displayed in a flashing red format or something similar.

Figure 12:
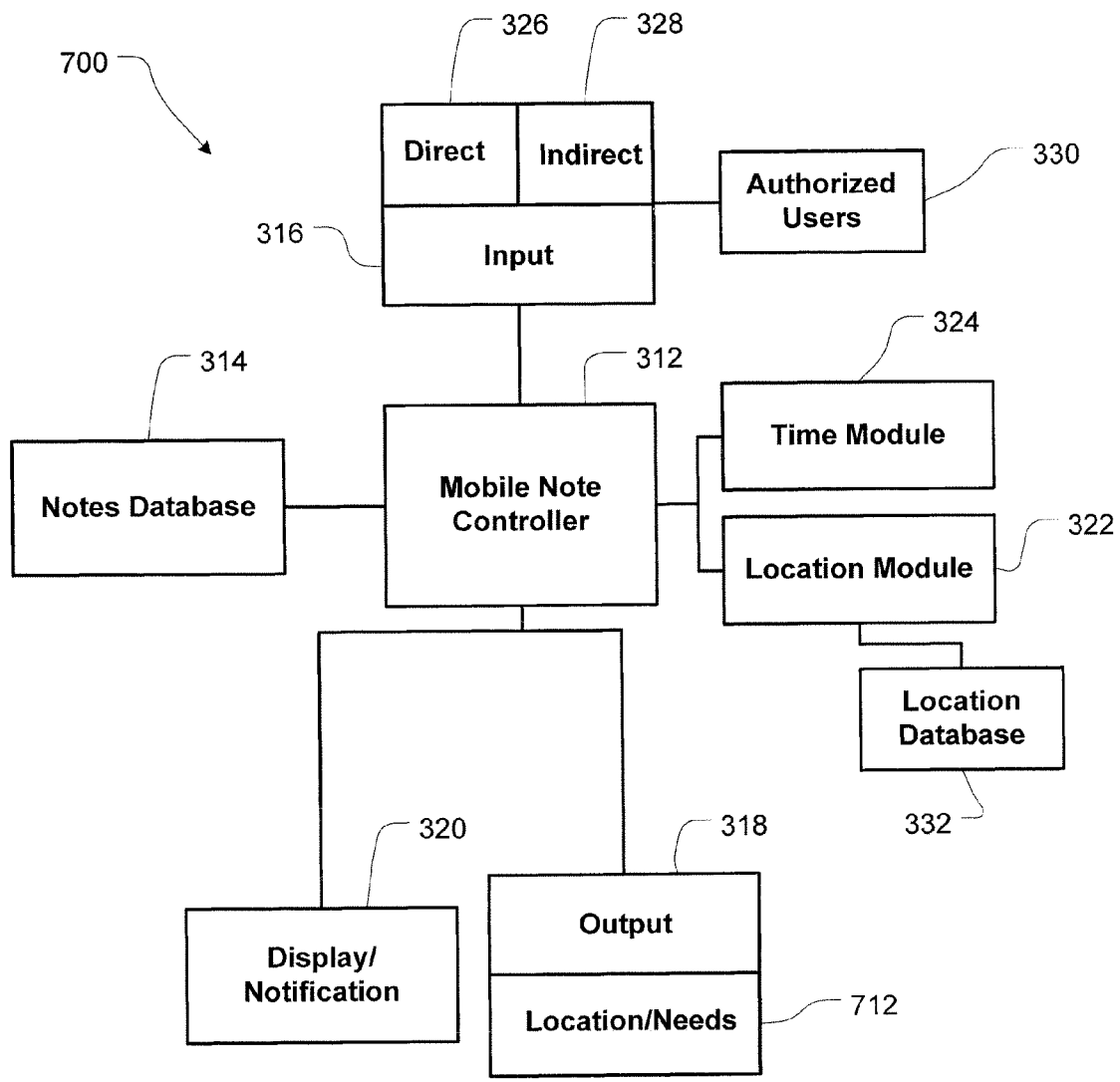
FIG. 12 is a functional block diagram of another embodiment of a system for electronic notes.

In yet another exemplary embodiment shown in FIG. 12, a system for electronic notes 700 in a mobile environment may further include a location/needs module 712 in the output module 318. Elements of this embodiment that are substantially similar to the previous embodiment will be identified by similar reference numbers.

The location/needs module 712 provides information from, for example, function notes, to the mobile note server 288 via the mobile note controller 312. The mobile note server 288 then interacts with the commerce server 276 (described above with regard to FIG. 4) to determine common information related to the function/category of an electronic note on a mobile device 100 with information on the commerce server 276. For example, the mobile note server 288 may conduct a search on the commerce server 276 for groceries as a type of product or for one or more particular products on the grocery function note and may include location information from the mobile device 100. The commerce server 276 can then provide information from the commerce server 276 related to merchants or stores that carry that type of product or the particular products that are within a predetermined range of the mobile device 100. In alternate embodiments, the commerce server 276 may provide further information related to the products, such as information that a product is "on sale" or the like.

In this embodiment, the user of the mobile device 100 benefits in that the user is notified when he/she is near a location that has a product that he/she is interested in. The user can then choose whether or not to visit that location to purchase the product. In a particular case, the location/needs module 712 (or the mobile note server 288) may also include a filter or the like (not shown), which allows the mobile device user to set a level of possible alerts from a commerce server 276. For example, the mobile device user might set the filter to avoid any notifications in which the product is not "on sale" or for any sale provided by the commerce server 276 that is less than, for example, 10% off of the merchant's standard pricing for the product or the like.

It will be understood that it will generally be preferable if the location/needs module 712 interacts with the mobile note server 288, which will then handle communications with the commerce server 276. However, in alternate arrangements, the location/needs module 712 may also interact directly with the commerce server 276.

Figure 13:
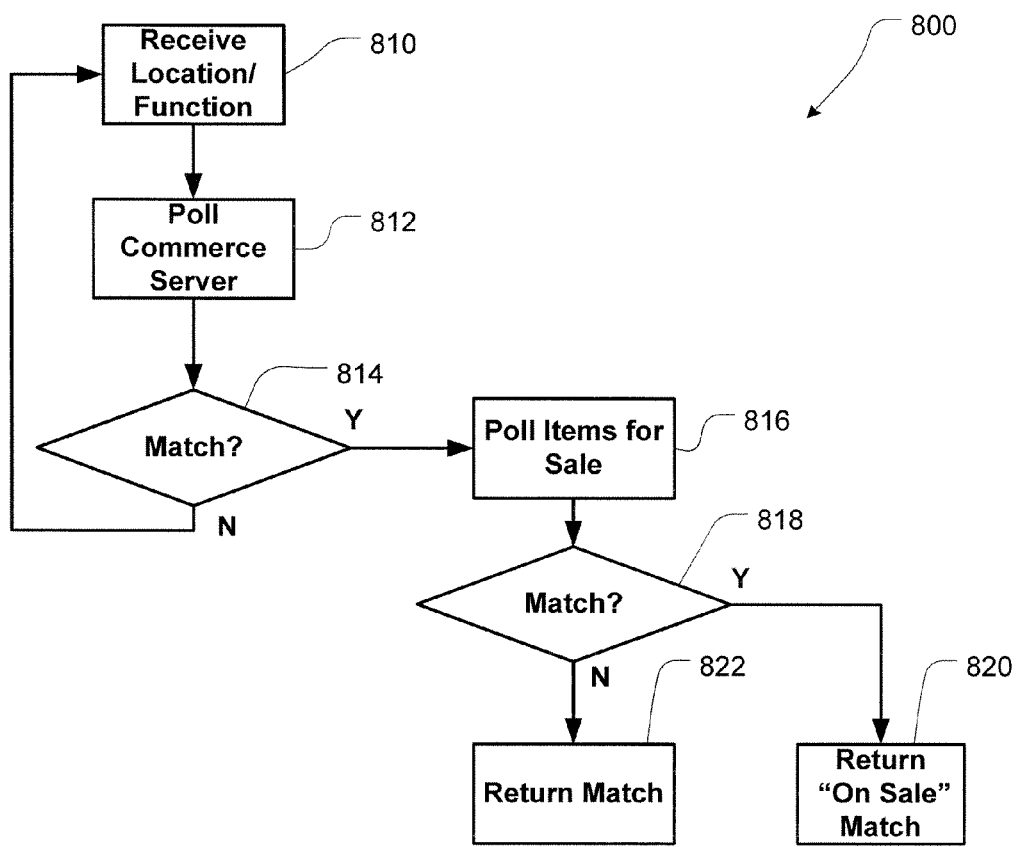
FIG. 13 is a flowchart of an exemplary method of operation of an electronic note server with a commerce server.

FIG. 13 is a flowchart illustrating an exemplary method 800 of operation of the electronic note server 288 working with the commerce server 276. At 810, the electronic note server 288 receives location and electronic note information from the mobile device 100. As noted above, the electronic note may include function and/or product information. Also it will be understood that the mobile note server 288 may already have saved a copy of the electronic notes locally for caching purposes. At 812, the mobile note server 288 then communicates with the commerce server 276 to poll the commerce server 276 for matching location or function/product information from merchants. It will be understood that the polling process may proceed in various ways as are known in the art, such as, for example, known or hereafter developed search techniques. The mobile note server 288 receives information from the commerce server 276 and then determines if there is a match between the location and function/product information of the merchant with the location of the mobile device and function/product information of an electronic note at 814. If there is a match, this result can be sent to the mobile note controller 312 and the electronic note may be activated at this point (not shown). However, in this example, the mobile note server 288 then further polls the commerce server 276 for products indicated as on sale at 816. It will be understood that the two polling operations at 812 and 816 could also be conducted together. Alternatively, the polling for products on sale could be performed on the results returned from the polling at 812. At 818, if a product on sale matches with the product information for an electronic note, the mobile note server 288 then returns the details of the sale to the mobile device 100 at 820 after which the electronic note may be activated. If there is no match for products on sale at 818, the mobile note server 288 may return that there is a match with regard to the function and location at 822. Lastly, if there has not been a match with regard to location and function at 814 then the mobile note server 288 continues monitoring for location and function group at 810.

As noted above, in this embodiment, a mobile device user can be notified of a match of location and function or of a sale on a product at a store in the vicinity. It will be understood that different notifications can be used depending on the type of notification, for example, for a sale product, the notification may include changing the color of the electronic note or the like.

It should be understood that various modifications can be made to the exemplary embodiments described and illustrated herein, without departing from the general scope of the appended claims. It should also be understood that while the embodiments have been described for electronic notes on mobile devices, the embodiments are generally applicable to electronic notes on various computing and communications devices. As such electronic notes could be entered, edited, or otherwise handled via a desktop or laptop computer or the like. Further, the various functions of elements such as the mobile note controller 312 and mobile note server 288 as well as other elements may be implemented as hardware or software and the functions may be distributed differently between the elements, as appropriate. For example, as described above, the function of comparing a new note with notes in a notes database to determine if an electronic note has been edited may be performed at the mobile note controller 312 or at the mobile note server 288 depending on the configuration.

We claim:

1. A system for handling electronic notes in a mobile device, the system comprising:
   a memory configured to store an electronic note and a filter, wherein the electronic note comprises product information identifying one or more products, and wherein the filter sets a minimum level of discounting before the electronic note is activated;
   a location detector configured to detect location information for the mobile device; and
   a processor configured to:
      receive product information, location information and sale information provided by a commerce server, wherein the sale information is updateable by said commerce server when data that indicates that at least one product of said one or more products is discounted from the standard pricing for the at least one product is received by said commerce server from a merchant;

monitor the location information for the mobile device based on data from the location detector;

compare the product information in the electronic note and the location information for the mobile device with the product information and location information provided by the commerce server; and activate the electronic note in response to the sale information provided by the commerce server being updated to indicate that the at least one product of said one or more products is discounted from the standard pricing for the at least one product by at least the minimum level of discounting set by the filter, when the location information for the mobile device is within a predetermined distance of the location information provided by the commerce server, and when the product information in the electronic note and the product information provided by the commerce server identify the at least one product of said one or more products.

2. The system of claim 1, wherein the memory is further configured to store location information and the processor is further configured to receive location information for storage in the memory.

3. The system of claim 1, wherein the system further comprises an input configured to receive electronic notes from another system and the processor is further configured to:
compare a received electronic note with stored electronic notes;
determine if the received electronic note corresponds to an edited version of one of said stored electronic notes; and
replace the one of said stored electronic notes with the received electronic note if the received electronic note corresponds to an edited version of the one of said stored electronic notes.

4. The system of claim 3, wherein the system is configured to receive electronic notes from another system via e-mail.

5. The system of claim 3, wherein the system further comprises an authorized sender list configured to store a list of users authorized to send notes to the system and further comprises a filter configured to block electronic notes from users that are not on the authorized sender list.

6. The system of claim 1, wherein the electronic note further comprises a function indicator and a list of one or more recipients and the processor is further configured to:
monitor for changes in an electronic note having a function indicator; and
send changes to the electronic note to the one or more recipients in order to synchronize the information in the electronic note with the one or more recipients.

7. The system of claim 1, further comprising a signaling device and wherein the processor is configured to activate the signaling device to provide a sensory signal as output at the mobile device when the electronic note is activated.

8. The system of claim 1, further comprising a time detector configured to detect time information of the mobile device, the electronic note further comprises time information, and the processor is further configured to:
monitor the time information of the mobile device based on data from the time detector;
compare the time information of the mobile device with the time information in the electronic note; and
activate the electronic note when the time information of the mobile device is within a predetermined range of the time information in the electronic note.

9. The system of claim 1, wherein the system further comprises an input configured to receive location information from another system and the processor is further configured to:
compare received location information with stored location information;
determine if the received location information corresponds to an updated version of stored location information; and
replace the stored location information with the received location information if the received location information corresponds to an updated version of the stored location information.

10. A method for handling electronic notes in a mobile device, the method comprising:
storing an electronic note, the electronic note comprising product information identifying one or more products;
setting a filter, wherein the filter sets a minimum level of discounting before the electronic note is activated;
receiving product information, location information and sale information provided by a commerce server, wherein the sale information is updateable by said commerce server when data that indicates that at least one product of said one or more products is discounted from the standard pricing for the at least one product is received by said commerce server from a merchant;
monitoring location information for the mobile device;
comparing the product information in the electronic note and the location information of the mobile device with the product information and location information provided by the commerce server; and
activating the electronic note in response to the sale information provided by the commerce server being updated to indicate that the at least one product of said one or more products is discounted from the standard pricing for the at least one product by at least the minimum level of discounting set by the filter, when the location information for the mobile device is within a predetermined distance of the location information provided by the commerce server, and when the product information in the electronic note and the product information provided by the commerce server identify the at least one product of said one or more products.

11. The method of claim 10, further comprising storing location information.

12. The method of claim 10, further comprising:
receiving electronic notes from another system;
comparing a received electronic note with stored electronic notes;
determining if the received electronic note corresponds to an edited version of one of said stored electronic notes; and
replacing the one of said stored electronic notes with the received note if the received electronic note corresponds to an edited version of one of said stored electronic notes.

13. The method of claim 12, wherein the electronic notes from another system are received via e-mail.

14. The method of claim 12, further comprising comparing received electronic notes with an authorized sender list and blocking received electronic notes that are not from an authorized sender.

15. The method of claim 10, wherein the activating comprises providing a sensory signal as output at the mobile device.

16. The method of claim 10, wherein the electronic note further comprises a function indicator and a list of one or more recipients and the method further comprises:
    monitoring for changes in an electronic note having a function indicator; and
    sending changes in the electronic note to the one or more recipients in order to synchronize the information in the electronic note with the one or more recipients.

17. The method of claim 10, wherein the electronic note further comprises time information and the method further comprises:
    monitoring time information of the mobile device;
    comparing the time information of the mobile device with the time information for the electronic note; and
    activating the electronic note when the time information of the mobile device approximately corresponds to the time information in the electronic note.

18. The method of claim 10, further comprising:
    receiving location information from another system;
    comparing received location information with stored location information;
    determining if the received location information corresponds to an updated version of stored location information; and
    replacing the stored location information with the received location information if the received location information corresponds to an updated version of stored location information.

19. The system of claim 1, further configured to receive product information from a mobile device and to poll a server for location or product information matching location or product information received from the mobile device.

20. The method of claim 10, further comprising receiving product information from a mobile device and polling a server for location or product information matching location or product information received from the mobile device.

* * * * *